US011644005B2

(12) United States Patent
Bernu et al.

(10) Patent No.: US 11,644,005 B2
(45) Date of Patent: May 9, 2023

(54) WIND TURBINE BLADE COMPRISING A ROOT END STRUCTURE WITH A PULTRUDED ELEMENT HAVING A TRANSITION PORTION

(71) Applicant: LM WIND POWER INTERNATIONAL TECHNOLOGY II APS, Kolding (DK)

(72) Inventors: Jalmer Bernu, Kolding (DK); Chad Pavlish, Kolding (DK); Jacob Samuelson, Kolding (DK); Henrik Barslev, Kolding (DK); Danny Kedochim, Kolding (DK)

(73) Assignee: LM WIND POWER INTERNATIONAL TECHNOLOGY II APS, Kolding (DK)

( * ) Notice: Subject to any disclaimer, the term of this patent is extended or adjusted under 35 U.S.C. 154(b) by 194 days.

(21) Appl. No.: 16/756,668

(22) PCT Filed: Oct. 18, 2018

(86) PCT No.: PCT/EP2018/078512
§ 371 (c)(1),
(2) Date: Apr. 16, 2020

(87) PCT Pub. No.: WO2019/077022
PCT Pub. Date: Apr. 25, 2019

(65) Prior Publication Data
US 2020/0332762 A1 Oct. 22, 2020

(30) Foreign Application Priority Data

Oct. 18, 2017 (EP) ..................... 17197088

(51) Int. Cl.
*F03D 1/06* (2006.01)
*B29C 70/34* (2006.01)
(Continued)

(52) U.S. Cl.
CPC .......... *F03D 1/0658* (2013.01); *B29C 70/342* (2013.01); *B29C 70/541* (2013.01);
(Continued)

(58) Field of Classification Search
None
See application file for complete search history.

(56) References Cited

U.S. PATENT DOCUMENTS 7,357,726 B2    4/2008  Thorning
9,790,918 B2 *  10/2017  Feigl ..................... F03D 1/0658
(Continued)

FOREIGN PATENT DOCUMENTS

EP    2781344 A1    9/2014
EP    3121441 A1    1/2017
(Continued)

OTHER PUBLICATIONS

International Search Report dated Feb. 12, 2019 issued in corresponding Application No. PCT/EP2018/078512.
(Continued)

*Primary Examiner* — Justin D Seabe
(74) *Attorney, Agent, or Firm* — Nath, Goldberg & Meyer; Jerald L. Meyer; Tanya E. Harkins

(57) ABSTRACT

This invention relates to a root end structure, a wind turbine blade comprising such a root end structure and a method of manufacturing such a wind turbine blade. The root end structure comprises a plurality of fastening members distributed along a root end of a blade part, wherein a first plurality of pultruded elements are arranged in between the fastening members and a second pultruded element is further arranged at the blade joint ends adjacent to an outermost fastening member. Each first pultruded element has opposite facing second sides each facing a first side of an adjacent fastening member. The second pultruded element has one
(Continued)

second side facing the outermost fastening member and another second side facing the blade joint interface. The second pultruded element comprises a transition portion forming a smooth transition for the inner layers extending further along the mould edge surface.

20 Claims, 7 Drawing Sheets

(51) Int. Cl.
    *B29C 70/54*         (2006.01)
    *B29K 105/08*      (2006.01)
    *B29L 31/08*       (2006.01)

(52) U.S. Cl.
    CPC .......... *B29C 70/545* (2013.01); *F03D 1/0675* (2013.01); *B29K 2105/08* (2013.01); *B29L 2031/085* (2013.01)

(56) References Cited

U.S. PATENT DOCUMENTS

| | | | |
|---|---|---|---|
| 9,995,271 B2 * | 6/2018 | Dahl | F03D 1/0658 |
| 10,060,411 B2 * | 8/2018 | Caruso | F03D 1/065 |
| 10,309,369 B2 * | 6/2019 | Dahl | F03D 1/0658 |
| 10,316,817 B2 * | 6/2019 | Klitgaard | F03D 1/065 |
| 11,460,000 B2 * | 10/2022 | Madsen | B29C 70/885 |
| 2013/0111752 A1 | 5/2013 | Madsen et al. | |
| 2013/0285284 A1 | 10/2013 | Moeller Larsen et al. | |
| 2014/0030096 A1 * | 1/2014 | Dahl | F03D 1/0658 416/217 |
| 2015/0233160 A1 | 8/2015 | Rogers | |
| 2017/0022825 A1 | 1/2017 | Caruso et al. | |
| 2017/0022968 A1 * | 1/2017 | Caruso | B29C 70/86 |
| 2017/0051718 A1 * | 2/2017 | Klitgaard | B29C 70/545 |

FOREIGN PATENT DOCUMENTS

| | | |
|---|---|---|
| RU | 2293897 C1 | 2/2007 |
| WO | 03/057457 A1 | 7/2003 |
| WO | 2015/004257 A1 | 1/2015 |

OTHER PUBLICATIONS

Indian Office Action dated May 17, 2022 for application No. 202047013292.

Russian Search Report completed on Jan. 24, 2022 for application No. 2020115001/04.

* cited by examiner

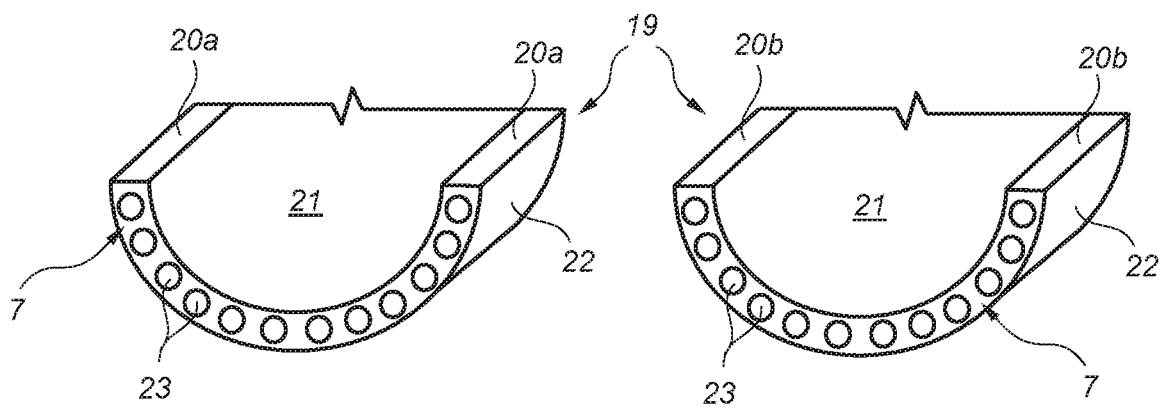
Fig. 3
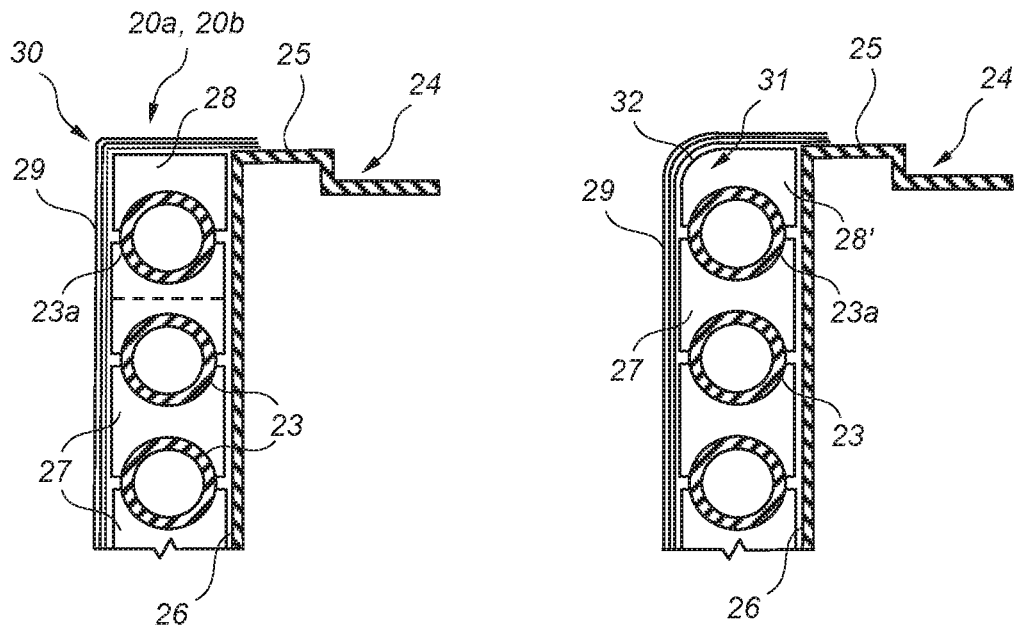
Fig. 4 - prior art
Fig. 5
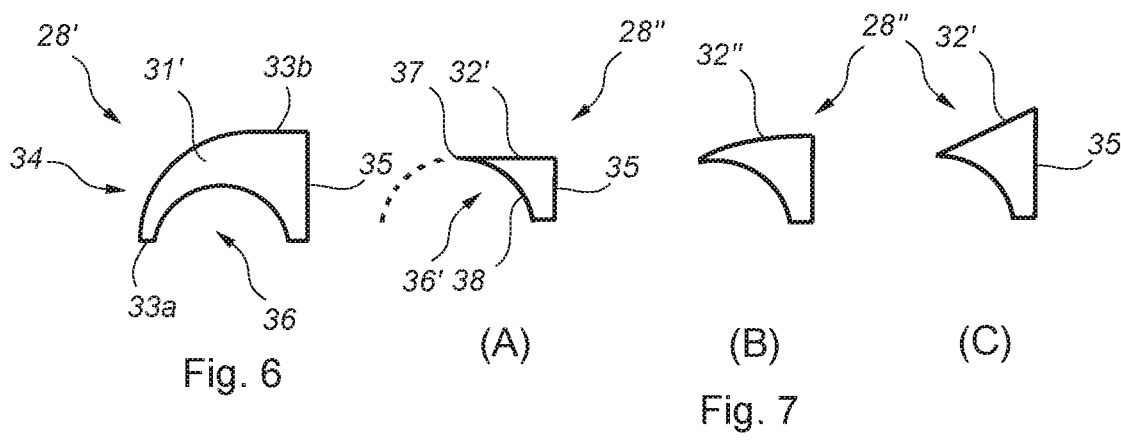
Fig. 6
Fig. 7

WIND TURBINE BLADE COMPRISING A ROOT END STRUCTURE WITH A PULTRUDED ELEMENT HAVING A TRANSITION PORTION

This is a National Phase Application filed under 35 U.S.C. 371 as a national stage of PCT/CN2018/078512, filed Oct. 18, 2018, an application claiming the benefit of European Application No. 17197088.2, filed Oct. 18, 2017, the content of each of which is hereby incorporated by reference in its entirety.

TECHNICAL FIELD

The present invention relates to a root end structure comprising a plurality of fastening members and a plurality of pultruded elements arranged in between each fastening member, wherein the fastening members and the pultruded elements are sandwiched between inner and outer layers of a fibre material.

The present invention further relates to a wind turbine blade comprising such a root end structure, and a method of manufacturing such a wind turbine blade.

BACKGROUND

The root end of wind turbine blades is manufactured by laying up a number of layers of a fibre material inside a mould to form an outer skin. A plurality of fastening elements is then positioned relative to the mould and the fibre layers, wherein the individual fastening elements are connected to a root end plate holding them in place during manufacturing. A plurality of retaining members is afterwards positioned between the individual fastening members. Further layers of the fibre material are laid up over the fastening and retaining members to form an inner skin. The structure is then enclosed by a bag material and resin is introduced using vacuum infusion. The resin is finally cured to form a first wind turbine blade. A second wind turbine part is manufactured in a similar manner, after which the two wind turbine blade parts are attached together.

Movements in the inner or outer skin may occur during the vacuum infusion, which could lead to a longitudinal misalignment between the retaining members and the outer skin. This may in turns lead to wrinkles in the transitional skin area at the end of the retaining elements, which will adversely affect the structural performance of the root end.

US 2615/6233166 A1 discloses such a root end configuration where bushings and butterfly shaped wedge elements are arranged between an inner skin and an outer skin. Various cross-sectional shapes of the bushings are disclosed. Each wedge element has a local inner surface and a local outer surface and opposite facing local side surfaces, wherein the local side surfaces have a profile corresponding to the profile of the local side surfaces of the bushings. This forms a tight fit and thereby prevents any relative movement between the bushings and the wedge elements.

US 2013/0111752 A1 discloses a root end configuration comprising a plurality of bushings distributed evenly along a semi-circular shaped root end structure, wherein rovings are arranged between the individual bushings. Each roving element extends partly along the length of the bushings and contacts opposite facing side surfaces of the adjacent bushings. The inner surface of each bushing is in direct contact with inner layers of a fibre material extending along the inner surface of the root end structure. Further, the outer surface of each bushing is in direct contact with outer layers of a fibre material extending along the outer surface of the root end structure. The outer layers of fibre material extend along a moulding surface and further along a mould edge surface. The inner layers of fibre material extend along the inner surface and a free facing side surface of the uppermost bushings and further along the mould edge surface. The uppermost bushings only contact the adjacent roving elements at the opposite side surface. The uppermost bushings thus form a transitional contact surface for laying up the layers of the inner skin over the mould edge.

US 2013/0285284 A1 discloses a root end configuration comprising a plurality of root end sections each comprising bushings spaced apart by spacer elements. The spacer element has a butterfly shaped portion extending along the length of the bushings and a wider wedge-shaped portion extending beyond the bushings in the lengthwise direction. The spacer element has opposite facing local side surfaces which contact corresponding local side surfaces of the adjacent bushings. The bushings have a greater outer diameter than the local thickness of the spacer element, wherein the local side surfaces of each spacer element have a curved profile so that it conforms to the curved profile of the bushings and thus forms a tight fit. This prevents any relative movement between the bushings and the spacer elements.

EP 3121441 A1 discloses a root end structure comprising bushings embedded in a pultruded element, wherein the embedded bushings are arranged between pultruded wedge elements. An outermost wedge element is arranged at the blade joint edge at one blade joint edge. The embedded bushings and the wedge elements each has a squared cross-sectional profile with a constant thickness.

OBJECT OF THE INVENTION

An object of the invention is to provide a root end structure, a wind turbine blade and a method of manufacturing such a wind turbine blade that overcomes the above-mentioned problems.

Another objection of the invention is to provide a root end structure, a wind turbine blade and a method of manufacturing such a wind turbine blade that reduces the risk of wrinkles forming at the blade joint interface.

A further objection of the invention is to provide a root end structure, a wind turbine blade and a method of manufacturing such a wind turbine blade that allowing for an improved lay-up of the fibre material.

DETAILED DESCRIPTION OF THE INVENTION

One object of the invention is achieved by root end structure of a wind turbine blade, the root end structure extending from a blade root into a root end portion of a blade shell formed by at least one blade part having an inner surface, an outer surface and at least one blade joint edge, the root end structure comprises a plurality of fastening members distributed along the root end of said at least one blade part in a circumference direction, each fastening member has a first inner surface, a first outer surface and opposite facing first side surfaces each extending in the longitudinal direction, wherein a second pultruded element is arranged between an outermost fastening member and a blade joint edge of the at least one blade part and, optionally, a first pultruded element is arranged between at least one pair of fastening members, each of the first and second pultruded elements has a second inner surface, a second outer surface and opposite facing second side surfaces further extending in the longitudinal direction, the root end structure further comprises a number of outer layers of a fibre material extending along the outer surface and a number of inner layers of a fibre material extending along the inner surface, wherein the second pultruded element forms a transition portion extending from one second side surface towards the other second side surface, wherein a local thickness of said transition portion tapers towards the blade joint edge and/or said other second side surface.

This provides an improved root end structure reducing the risk of wrinkles forming at blade joint ends by providing a smooth transition of the inner layers over the outermost pultruded element. This also increases the structural load transfer at the blade joint interface.

The fastening members, e.g. bushings, are held in a fixed longitudinal position relative to the outer layers forming the outer skin. This may be achieved by temporary mounting the bushings to a root end plate positioned at the root end. The root end plate may be mounted or fixed directly to the blade mould or held in place relative to the blade mould by a holding structure.

The retaining members, e.g. the pultruded elements, are sandwiched between an inner skin and the outer skin defining the inner and outer surfaces of the blade shell, respectively. The inner skin may be formed by a number of inner layers of a fibre material. The outer skin may be formed by a number of outer layers of the same fibre material or a different fibre material. The fibre material may include fibres made of glass, carbon, aramid or any combinations thereof. Each skin may include two, three, four or more individual layers.

Each bushing has a local first inner side facing the inner skin and a local first outer side facing the outer skin. Each bushing further has opposite facing local first sides extending between the local inner and outer sides. Similarly, each pultruded element has a local second inner side facing the inner skin and a local second outer side facing the outer skin. Each pultruded element further has opposite facing local second sides extending between the local inner and outer sides. The bushing and the pultruded element each has a local thickness measured between the inner and outer sides and a local width measured between the two first or second sides.

A pultruded element, i.e, first pultruded element, may be arranged between each pair of adjacent bushings. A further pultruded element, i.e. second pultruded element, is arranged at one or both blade joint edges of the blade part, wherein the second pultruded element is positioned adjacent to an outermost bushing facing that blade joint edge. This allows all the bushings to be sandwiched between individual pultruded elements. Alternatively, the bushings may be embedded into integrated elements, e.g. the first pultruded elements, and thus the second pultruded element may be positioned adjacent to an outermost integrated element, e.g. a first pultruded element. Alternatively, the first pultruded elements may be omitted and replaced by another spacer structure.

The inner skin may extend over the second pultruded element and further along a mould edge surface of the blade mould during the lay-up process. After moulding of the blade part, e.g. before or after curing of the resin, the inner and outer skin may be trimmed off to form the respective blade joint edges.

According to one embodiment, said transition portion forms a transitional contact surface contacting the inner layers, wherein said transitional contact surface forms at least a part of the second inner surface.

The first pultruded element may have a recess formed in both local second sides, wherein each recess is configured to receive a local first side of an adjacent bushing. The recess may extend partly or fully along the local second sides. The recess may have a second side surface forming a surface profile that corresponds to a surface profile formed by a first side surface of the bushing. Alternatively, the first and second side surfaces may have different surface profiles.

The second pultruded element may have a similar recess formed in the local second side facing the outermost fastening member. The opposite local second side may together with the inner layers form the adjoining blade joint edge. The second pultruded element may have a maximum width which is equal to or smaller than the maximum width of the first pultruded element. For example, the maximum width of the second pultruded element may be between 25% to 75%, e.g. between 40% to 60%, e.g. 50%, of the maximum width of the first pultruded element. But, other widths may also be used.

The second pultruded comprises a transition portion extending from the blade joint edge towards the outermost fastening member. The transition portion has a transitional contact surface shaped to form a smooth transition of the inner layers. The transition portion has a local thickness which tapers from a maximum thickness towards to a minimum thickness.

According to one embodiment, said transitional contact surface further forms at least a part of said one side second side surface.

The transition portion may extend along a part of the width of the second pultruded element. A first non-transition portion may thus be arranged adjacent to the transition portion and extend along the remaining part of the width of the second pultruded element. The first non-transition portion may have a uniform local thickness, e.g. corresponding to the abovementioned maximum thickness. The transition portion and the first non-transition portion may together define inner side of the second pultruded element.

The transition portion may extend along a part of the thickness of the second pultruded element. A second non-transition portion may thus be arranged adjacent to this transition portion and extend along the remaining part of the thickness of the second pultruded element. The second non-transition portion may have a local width corresponding to a maximum width of the second pultruded element or a variable local width. The transition portion and the second non-transition portion may together define an outermost second side of the second pultruded element. This forms a relative short transition between the inner side and the second side.

Alternatively, the transition portion may extend along the entire width and/or the entire thickness of the second pultruded element. The transitional contact surface may thus define the entire inner side and/or the outermost second side of the second pultruded element. The width of the second pultruded element may thereby taper or vary over the entire thickness, and vice versa. This forms a longer and smoother transition between the inner side and the second side.

Preferably, the transition portion extend along 10% to 100%, e.g. between 25% to 75%, e.g. 50%, of the inner side and/or of the second side. This enhances the drapability of the inner layers over the blade mould edge as the second pultruded element do not form any sharp transitional contact surfaces.

According to one embodiment, the second pultruded element is terminated at an inner point in a thickness direction, wherein the outermost fastening member extends beyond the inner point of the second pultruded element in the thickness direction.

The recesses of the first pultruded element may extend along the entire second sides and thus intersect with the local inner and outer sides. Each recess may alternatively extend along a part of that second side and thus intersect with a planar side surface located on opposite sides of the recess. The individual corners of the first pultruded element may be rounded to form a smooth transition between the individual surfaces.

Similarly, the recess of the second pultruded element may extend along the entire second side and thus intersect with the inner and outer sides. Alternatively, the recess may extend along a part of that second side and thus intersect with a planar side surface located on opposite sides of the recess. The individual corners of the second pultruded element may be rounded to form a smooth transition between the individual surfaces.

The first and second pultruded elements may have the same maximum thickness and thus extend equally along the outermost bushing. Alternatively, the second pultruded element may have a reduced thickness compared to the thickness of the first pultruded element. The second pultruded element may thus extend partly along the outermost bushing in the thickness direction.

The transitional contact surface or the inner side surface may thus intersect with the second side surface of the recess. This intersection point may thus define an inner point at which the second pultruded element may be terminated. This allows the inner layers to have an increased contact with the outermost bushing.

According to one embodiment, the transition portion has a planar surface profile arranged in an angle relative to the local outer surface of the second pultruded element.

The transitional contact surface may have a planar surface profile, wherein this planar surface may be placed in a predetermined angle relative to the outer side surface of the second pultruded element.

The planar surface may for example extend perpendicularly to the outer side surface. In this configuration, the planar surface may extend from the outer side to the above-mentioned inner point. The inner side may in this configuration be defined by an inner edge extending along this inner point in the longitudinal direction.

Alternatively, the planar surface may extend in an inclined angle relative to the outer side surface, e.g. between 30° and 90°, preferably between 45° and 60°. However, other angles may be used.

According to one embodiment, the transition portion has a curved surface profile, preferably a circular or elliptical arc profile having a predetermined radius.

The transitional contact surface may instead have a curved profile having a predetermined curvature. The curved profile may for example be a circular arc profile having a predetermined radius. This forms a smooth transition over the second pultruded element so that any sharp bends or transitions in the inner layers are avoided.

The curved profile may for example be an elliptic arc profile having predetermined radii. The radii may be defined by a maximum radius measured along a major axis and a minimum radius measured along a minor axis. This also forms a smooth transition over the second pultruded element so that any sharp bends or transitions in the inner layers are avoided.

According to one embodiment, the transition portion extends along partly or fully along a length of the second pultruded element.

The first and second pultruded elements may have a total length corresponding to the length of the bushings. Alternatively, the first and second pultruded element may have a first portion with a local length corresponding to the length of the bushing and a second portion extending beyond the bushings towards the tip end. The second portion may have a local length corresponding to the length of a spacer element placed at the end of the bushing. The second portion of the first and second pultruded elements and this spacer element may have the same longitudinal profile, e.g. a tapered profile, to form a smooth transition between the root end region and the rest of the blade shell. In this configuration, the first and second pultruded element may have a uniform width along this total length.

Alternatively, the spacer elements may be omitted and the second portions of the second pultruded element and the subsequent first pultruded element may extend into this spacing to fill up this spacing. In this configuration, the two pultruded elements may have a first width along the first portion and a second width along the second portion. This reduces the total number of items needed to form the root end structure.

According to one embodiment, the second pultruded element comprises a first sub-piece and at least one second sub-piece arranged relative to the first sub-piece, wherein said first sub-piece and said at least one second sub-piece extend in the longitudinal direction.

The first pultruded element and/or the second pultruded element may be formed as a single continuous element extending in the length direction. This reduces the total number of item needed for manufacturing the root end structure and allows for a simplified lay-up process.

The first pultruded element may also be formed by a number of sub-pieces extending in the length direction, wherein the sub-pieces are arranged relative to each other to form a substantial butterfly shaped cross-sectional profile in the width direction. This allows for an alternative lay-up process.

Alternatively or additionally, the second pultruded element may also be formed by a number of sub-pieces arranged relative to each other. The sub-pieces together may form a substantial half-butterfly shaped cross-sectional profile in the width direction. For example, the second pultruded element may comprise at least two sub-pieces arranged symmetrical relative to each other. The sub-pieces may be arranged back-to-back or front-to-front to form the half-butterfly shaped cross-sectional profile.

For example, a first sub-piece may extend in the thickness direction and have a substantial rectangular cross-sectional profile in the width direction. A set of second sub-pieces may be arranged relative to the first sub-piece and project outwards from a side surface of the first sub-piece. The second sub-pieces may each have a substantial triangular shaped cross-sectional profile. The second sub-pieces may be positioned at the local inner side and at local outer side, respectively. The first and second sub-pieces together form the half-butterfly shaped cross-sectional profile.

For example, a first sub-piece may extend in the width direction and have a substantial parallelogram shaped cross-sectional profile in the width direction. A second sub-piece may project outwards from a side surface of the first sub-piece and extend in the thickness direction. The second sub-piece may have a substantial rectangular shaped cross-sectional profile in the width direction. A third sub-piece may project outwards from a side surface of the second sub-piece and extend in the width direction. The third sub-piece may have a substantial triangular cross-sectional profile in the width direction. These three sub-pieces together form the half-butterfly shaped cross-sectional profile.

The transition portion may form part of one of the above sub-pieces, e.g. the first sub-piece. This allows the transition portion to be integrally formed by the above sub-pieces. Alternatively, the transition portion may be formed as a separate sub-piece arranged relative to the other sub-pieces.

One object of the invention is also achieved by a wind turbine blade, the wind turbine blade extending from a blade root to a tip end in a longitudinal direction and further from a leading edge to a trailing edge in a chordwise direction, the wind turbine blade comprising a blade shell formed by at least two blade parts each having an inner surface and an outer surface, wherein said at least two blade parts are connected along at least one blade joint interface in the longitudinal direction, each blade joint interface is defined by a first blade joint edge of one blade part and a second blade joint edge of other blade part, characterised in that said at least two blade parts comprises a root end structure configured as described above.

This provides a wind turbine blade with an improved root end structure as described above. The above described root end structure reduces the risk of wrinkles forming at the respective blade joint ends. The transition portions of the second pultruded elements provides an improved lay-up of the inner layers which, in turns, allows for a better structural load transfer.

The wind turbine blade is formed by at least two blade parts each defining a pressure side and a suction side of the blade shell. The blade shell of each blade part has an inner surface defined by the inner layers and an outer surface defined by the outer layers. The two blade parts are jointed together at blade joint interfaces located at the trailing edge and the leading edge, respectively. Each joint interface comprises a first blade joint edge of one blade part and a second blade joint edge of another blade part. The blade parts may further be jointed together via shear webs or a box beam located between the trailing edge and the leading edge.

One object of the invention is further achieved by a method of manufacturing a wind turbine blade, comprising the steps of:
  laying up a number of outer layers of a fibre material along a blade mould surface,
  providing a plurality of fastening members configured to mount the wind turbine blade to a rotor hub interface or a pitch bearing unit,
  positioning said fastening members relative to said outer layers (44) at a root end of said wind turbine blade,
  positioning a second pultruded element between an outermost fastening member and a blade joint edge of the at least one blade part and, optionally, positioning a first pultruded element between at least one pair of fastening members,
  further laying up a number of inner layers of a fibre material along said first and second pultruded elements and said fastening members to form a root end structure,
  enclosing at least the root end structure via a vacuum bag material,
  introducing resin into said fibre material,
  curing said resin to form a cured blade part, wherein the inner layers extend over a transitional contact surface of the second pultruded element and further along a mould edge surface during the lay-up.

This provides a manufacturing method that allows for an improved lay-up of the inner layers. The above root end structure enhances the drapability of inner layers over the mould blade edge by providing a smooth transitional contact surface over the second pultruded elements. This eliminates any sharp corners and thus reduces the risk of wrinkles forming at the blade joint interface.

The wind turbine blade may be manufactured by laying up a number of outer layers along a blade mould surface, wherein these outer layers extend further along a mould edge surface.

The fastening members, e.g. bushings, may then be positioned relative to these outer layers and held in place relative to the root end by any suitable means during the lay-up. The retraining members, e.g. pultruded elements, may then be positioned in between the individual bushings and, optionally, also at blade joint ends. This positioning of the pultruded elements and/or of the bushings may be done prior to moving the entire structure into position relative to the root end of the outer layers.

Afterwards, a number of inner layers are laid up along the local inner surfaces of the bushings and/or the pultruded elements, wherein these inner layers extend over the outermost bushing or pultruded element and further along the mould edge surface.

A vacuum bag material is then placed over the root end structure and resin is introduced, e.g. using any type of a VARTM system. The resin is set to cure to form a cured blade part. The process is repeated for the other blade part.

According to one embodiment, the inner layers further extend over a portion of the outermost fastening member.

During the lay-up process, the inner layers may extend over a surface portion of the outermost bushing, if the second pultruded element has a reduced thickness compared to the outermost bushing. This allows the outermost bushing to be located closer to the blade joint edge. This surface portion may this form part of a wider transitional surface for the inner layers.

According to one embodiment, excess fibre material of at least the inner layers is trimmed off in a post lay-up step or in a post-moulding step.

Excess lengths of the inner and outer layers may be trimmed off at or near the blade joint edges prior to joining the two blade parts. This may be done after the lay-up process is completed or in a post-moulding process. The inner and outer layers may be trimmed by means of any suitable type of cutting tool or machine.

The two blade parts may then be joined together at the blade joint interface to form the wind turbine blade.

DESCRIPTION OF DRAWINGS

The invention is explained in detail below with reference to embodiments shown in the drawings, in which
FIG. 3 shows an exemplary embodiment of a root end structure,
FIG. 4 shows a cross-sectional view of a first embodiment of the root end structure placed in a blade mould,
FIG. 5 shows a cross-sectional view of a second embodiment of the root end structure placed in the blade mould,
FIG. 6 shows a third embodiment of the second pultruded element,
FIGS. 7*a-c* show three views of a fourth embodiment of the second pultruded element,
FIGS. 9*a-b* show two views of a sixth embodiment of the second pultruded element.

LIST OF REFERENCES

Figure 1:
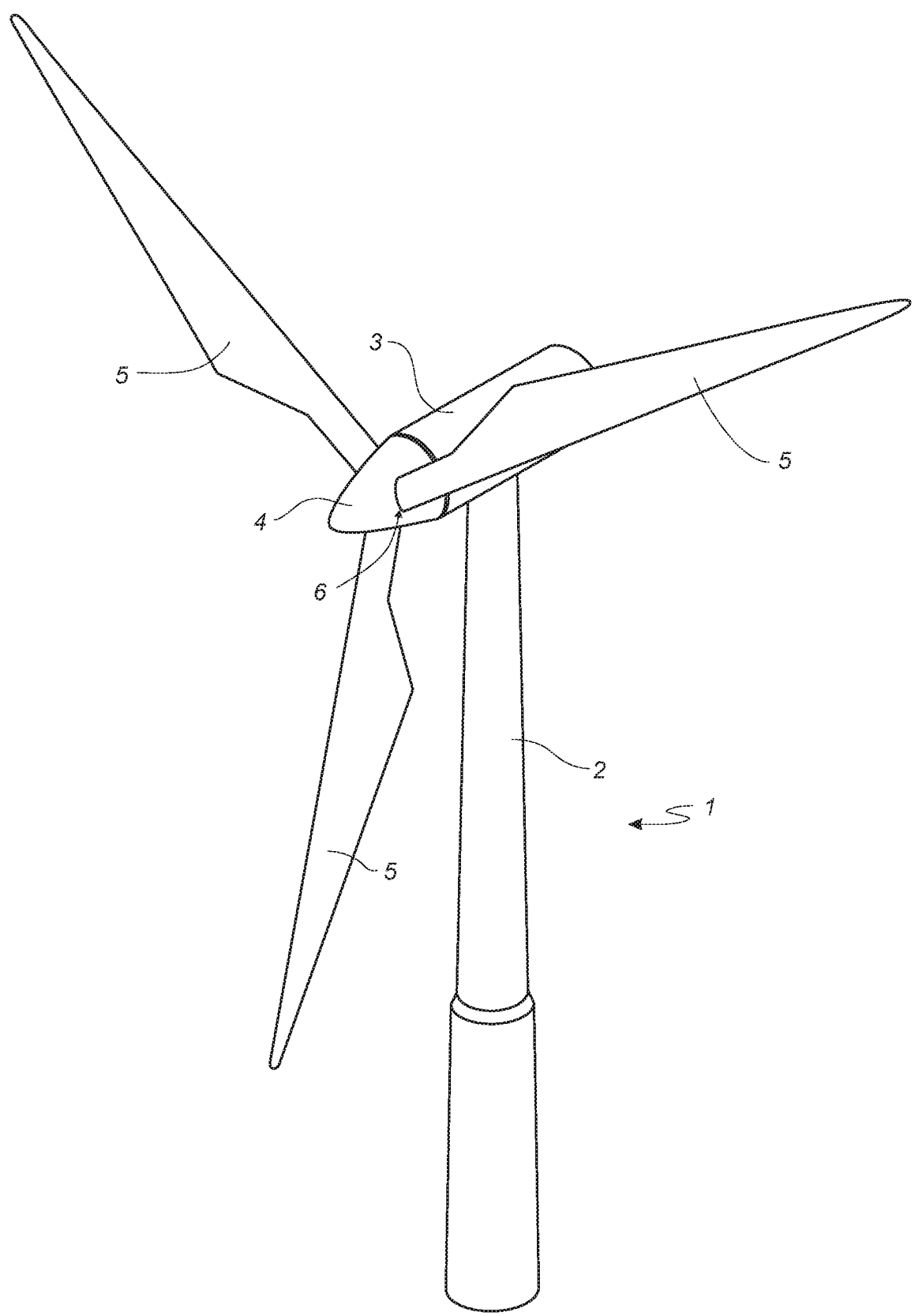
FIG. 1 shows a wind turbine.

1, Wind turbine
2. Wind turbine tower
3. Nacelle
4. Hub
5. Wind turbine blades
6. Pitch bearing
7. Blade root
8. Tip end
9. Leading edge
10. Trailing edge
11. Blade shell
12. Pressure side
13. Suction side
14. Blade root portion
15. Aerodynamic blade portion
16. Transition portion
17. Length of wind turbine blade
18. Chord length of wind turbine blade
19. Root end structure
20*a*. First blade joint edge
20*b*. Second blade joint edge
21. Inner surface
22. Outer surface
23. Fastening members, bushings
23*a*, Outermost fastening member, bushing
24. Blade mould
25. Blade mould surface
26. Mould edge surface
27. First pultruded element, retaining member
27*a-b*. First and second portions
28. Second pultruded element, retaining member
28*a-c*. First, second and third sub-pieces
29. Inner layers
30. Wrinkles
31. Transition portion
32. Transitional contact surface
33*a-b*. Local second sides
34. Local inner side
35. Local outer side
36. Recess
37. Inner point
38. Second side surface
39. Local inner side
40. Local outer side
41*a-b*. Local first sides
42. Outer layers
43. Gap
44. First side surface
45. Contact area
46. First sub-piece
47. Second sub-piece
48. Wrinkles
49. Spacer elements The listed reference numbers are shown in abovementioned drawings where no all reference numbers are shown on the same figure for illustrative purposes. The same part or position seen in the drawings will be numbered with the same reference number in different figures.

DETAILED DESCRIPTION OF THE DRAWINGS

FIG. 1 shows a modern wind turbine 1 comprising a wind turbine tower 2, a nacelle 3 arranged on top of the wind turbine tower 2, and a rotor defining a rotor plane. The nacelle 3 is connected to the wind turbine tower 2, e.g. via a yaw bearing unit. The rotor comprises a hub 4 and a number of wind turbine blades 5. Here three wind turbine blades are shown, but the number of blades may be greater or smaller. The hub 4 is connected to a drive train located in the wind turbine 1 via a rotation shaft.

The hub 4 comprises a mounting interface for each wind turbine blade 5. A pitch bearing unit 6 is optionally connected to this mounting interface and further to a blade root of the wind turbine blade 5.

Figure 2:
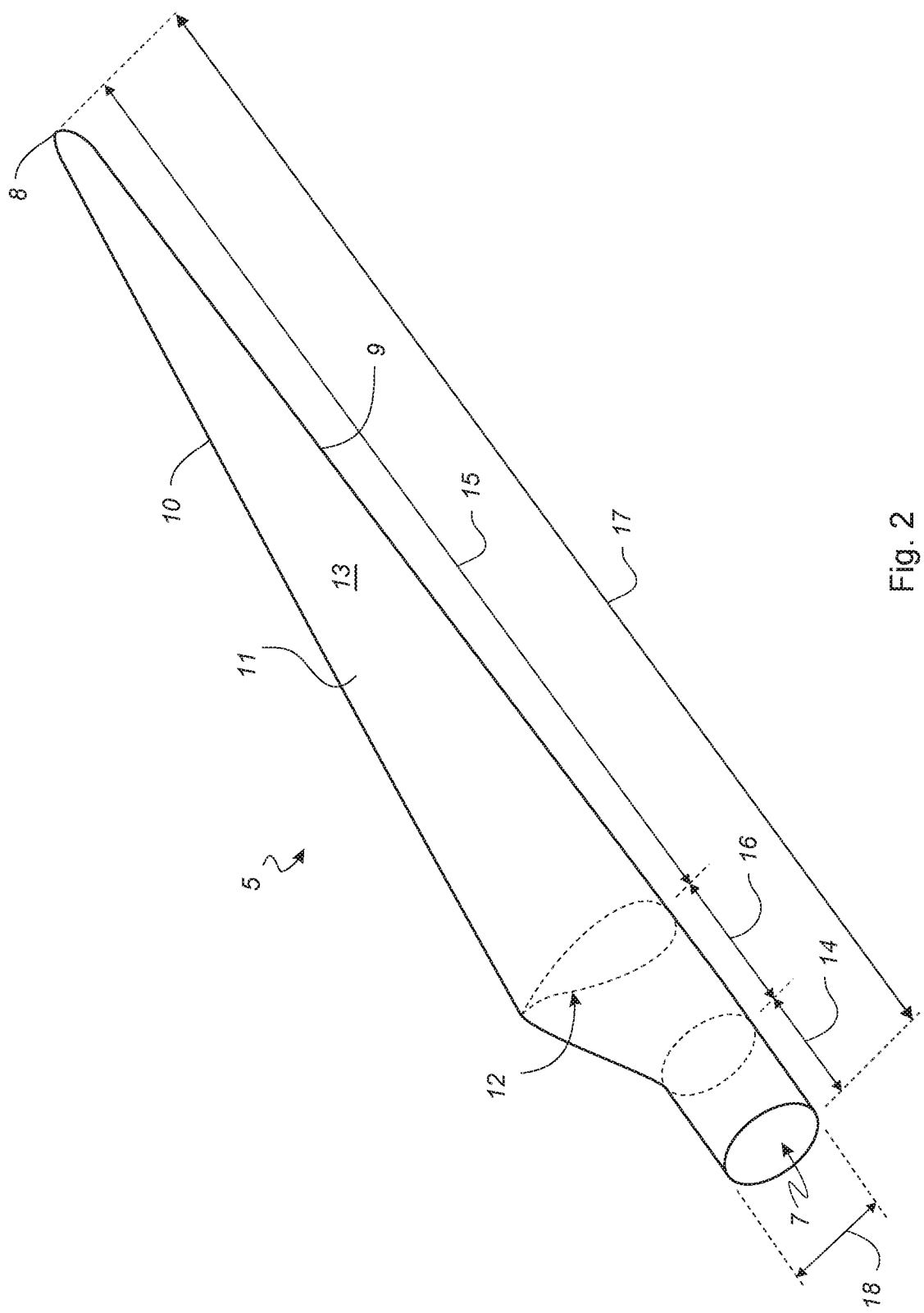
FIG. 2 shows an exemplary embodiment of the wind turbine blade.

FIG. 2 shows a schematic view of the wind turbine blade 5 which extends in a longitudinal direction from a blade root 7 to a tip end 8. The wind turbine blade 5 further extends in a chordwise direction from a leading edge 9 to a trailing edge 10. The wind turbine blade comprises a blade shell 11 having two opposite facing side surfaces defining a pressure side 12 and a suction side 13 respectively. The blade shell 11 further defines a root portion 14, an aerodynamic portion 15, and a transition portion 16 between the root portion 14 and the aerodynamic portion 15.

The root portion 14 has a substantially circular or elliptical cross-section (indicated by dashed lines). The root portion 14 together with a load carrying structure (not shown) are configured to add structural strength to the wind turbine blade 5 and transfer the dynamic loads to the hub 4. The load carrying structure extends between the pressure side 12 and the suction side 13 and further in the longitudinal direction.

The aerodynamic blade portion 15 has an aerodynamically shaped cross-section (indicated by dashed lines) designed to generate lift. The cross-sectional profile of the blade shell 11 gradually transforms from the circular or elliptical profile into the aerodynamic profile in the transition portion 16.

The wind turbine blade 5 has a longitudinal length 17 of at least 35 metres, preferably at least 50 metres. The wind turbine blade 5 further has a chord length 18 as function of the length 17, wherein the maximum chord length is found between the aerodynamic portion 15 and the transition portion 16. The wind turbine blade 5 further has a blade thickness as function of the chord length 18, wherein the blade thickness is measured between the pressure side 12 and the suction side 13.

FIG. 3 shows an exemplary embodiment of a root end structure 19 formed by two blade parts where one blade part comprises two first blade joint edges 20a and the other blade part comprises two second blade joint edges 20b. The blade joint edges 20a, 20b extend in the longitudinal direction and, when joined together, the first and second blade joint edges 20a, 20b form a leading edge joint interface and further a trailing edge interface.

The blade shell 11 of the root end structure 19 forms an inner surface 21 and an outer surface 22. A plurality of fastening members 23 are distributed along the root end 7 in a first circumference direction. A plurality of retaining members (shown in FIGS. 4 and 5) are arranged relative to each of the fastening members 23, wherein the fastening members 23 and the retaining members are sandwiched between a number of inner layers (shown in FIGS. 18-19) and a number of outer layers (shown in FIGS. 18-19).

FIG. 4 shows a cross-sectional view of the root end structure 19 placed in a blade mould 24. The blade mould 24 has a blade mould surface 25 having a predetermined surface profile and a mould edge surface 26.

The outer layers (shown in FIGS. 18-19) extend along the blade mould surface 26 and further along the mould edge surface 25 during the lay-up, but are removed in FIGS. 4 and 5 for illustrative purposes. The outer layers form an outer skin of the blade shell 11 defining the outer surface 22.

The fastening members 23 are here formed as bushings each arranged between a pair of adjacent retaining members. The retaining members are here formed as pultruded elements. A first pultruded element 27 is arranged between a pair of adjacent bushings 23 while an outermost bushing 23a is arranged between a first pultruded element 27 and a second pultruded element 28.

The first pultruded element 27 may be formed as a single continuous element, or by a number of sub-pieces. Here, two symmetrical sub-pieces are shown which are arranged back-to-back, as indicated by the dashed line. The first pultruded element 27 has a butterfly shaped cross-sectional profile in the width direction.

The second pultruded element 28 has a semi-butterfly shaped cross-sectional profile in the width direction. The second pultruded element 28 is arranged at the first and/or second blade joint edge 20a, 20b, FIG. 4 shows a prior art embodiment of the second pultruded element 28 where a sharp transition is formed between the second side surface (see FIG. 6) and the second inner surface (see FIG. 6). Wrinkles 30 are thus formed in the inner layers 29 at the blade joint edge 20a, 20b due to this sharp transition.

Figure 16:
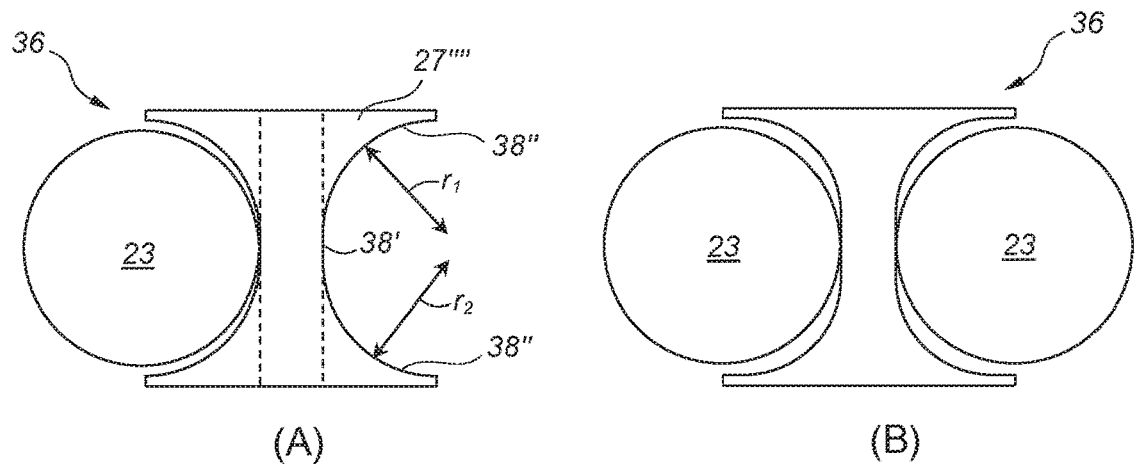
FIG. 16 shows a sixth embodiment of the first pultruded element.

During lay-up, the inner layers 29 extend along the local inner sides (shown in FIGS. 6 and 16) of the first pultruded elements 27, over the second pultruded element 28 and further along the mould edge surface 25. Excess material of the inner 29 and outer layers are trimmed off after curing. The inner layers 29 form an inner skin of the blade shell 11 defining the inner surface 21.

FIG. 5 shows a cross-sectional view of the root end structure 19 still placed in the blade mould 24, wherein the root end structure 19 comprises a first embodiment of the second pultruded element 28'.

Here, the second pultruded element 28' comprises a transition portion 31 forming a transitional contact surface 32 for contacting the inner layers 29. The local thickness of this transition portion 31 tapers towards the second side surface (see FIG. 6) facing the blade joint edge 20a, 20b. The local width of the transition portion 31 further tapers towards the second inner side (shown in FIG. 6). The transitional contact surface 32 forms a smooth transition of the inner layers 29, thereby reducing the risk of wrinkles 30.

FIG. 6 shows a second embodiment of the second pultruded element 28', wherein the transition portion 31' extend along the entire width of the second pultruded element 28'. The local thickness tapers from one second side 33a to an opposite second side 33b.

Here, the transition portion 31' extends along the entire local inner side 34 of the second pultruded element 28' and partly along the local second side 33b. The transition port 31' may extend fully along both the local inner side 34 and the local second side 33b. The transition port 31' may also extend partly along both the local inner side 34 and the local second side 33b, as indicated in FIG. 5.

The second pultruded element 28' further has a local outer side 35 facing the outer layers.

A recess 36 is formed in the local second side 33a of the second pultruded element 28 and in both local second sides 33a, 33b of the first pultruded element 27. The recesses 36 are configured to partly receive the outermost bushing 23a, as indicated in FIG. 4. The recess 36 may extend partly along the local second side 33a, as indicated in FIG. 6, or alternatively along the entire local second side 33a.

FIGS. 7a-c show three views of a third embodiment of the second pultruded element 28", wherein the profile of the second pultruded element 28', 28" is terminated at the local inner side 34 or at an inner point 37 forming an inner edge.

In FIG. 7a, the transitional contact surface 32' has a planar surface profile which extends perpendicularly from the local outer side 35. The transitional contact surface 32' intersects a second side surface 38 of the local second side 33a, thereby forming a reduced recess 36' for receiving the outermost bushing 23a. The recess 36 may have a semi-circular shaped profile while the recess 36' may have circular segment shaped profile. The inner layers 29 may thus contact a portion (dashed line) of the outer surface of the outermost bushing 23a, as indicated in FIG. 7a.

In FIG. 7b, the transitional contact surface 32" has a curved profile extending from the local outer side 35 to the inner point 37. In FIG. 7c, the transitional contact surface 32' has a planar surface profile which extends in an inclined angle relative to the local outer side 35.

Figures 8, 9:
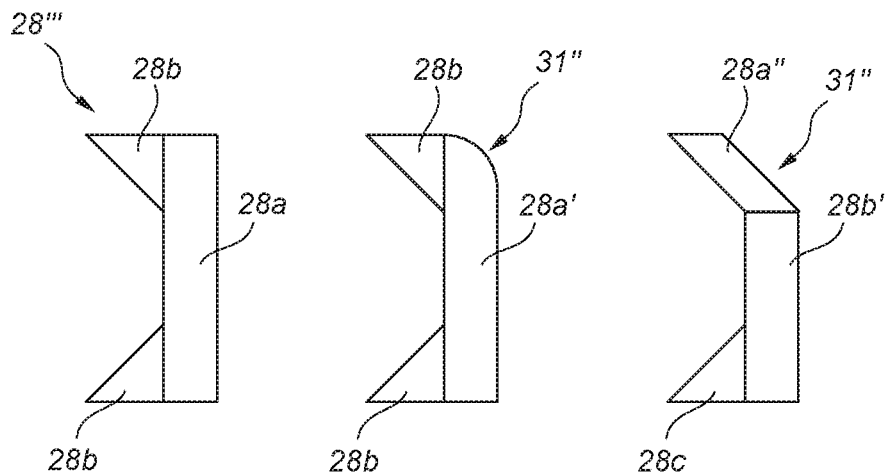
FIG. 8 shows a fifth embodiment of the second pultruded element.

FIG. 8 shows a fourth embodiment of the second pultruded element 28''' comprises a number of sub-pieces which together form a substantial semi-butterfly shaped cross-sectional profile in the width direction. A first sub-piece 28a extends in the thickness direction and a set of second sub-pieces 28b projects from a side surface of the first sub-piece 28a. Here, a second sub-piece 28b is arranged at both the local inner and outer sides 34, 35.

The individual sub-pieces 28a, 28b together form the recess 36 for partly receiving the outermost bushing 23a.

FIGS. 9a-b show two views of a fifth embodiment of the second pultruded element 28'''', wherein the transition portion 31" is integrally formed by one of the sub-pieces 28a-c.

In FIG. 9a, the first sub-piece 28a' has a substantial rectangular profile in the width direction, wherein the transition portion 31" is facing the local inner side 34. The second sub-pieces 28b have a substantial triangular profile in the width direction.

In FIG. 9b, the first sub-piece 28a" extends in the width direction and has a substantial parallelogram shaped profile. Here, the transition portion 31" form one end of the first sub-piece 28a". The second sub-pieces 28b' extends in the thickness direction and has a substantial rectangular profile in the width direction. Further, a third sub-piece 28c projects from a side surface of the second sub-piece 28b and has a substantial triangular profile in the width direction.

Figure 10:
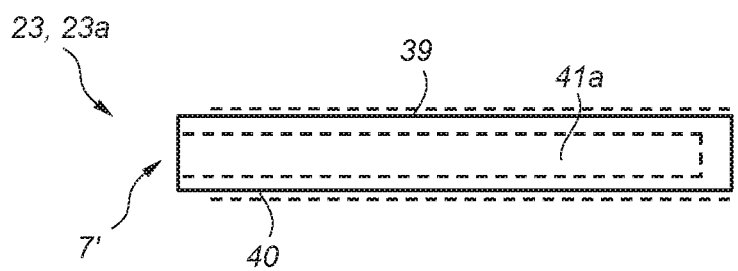
FIG. 10 shows a side view of the fastening member.

FIG. 10 shows a side view of the fastening member 23, 23a having a predetermined length measured between a local root end 7' and an opposite end. Here, the fastening member 23, 23a has a uniform cross-sectional profile in the length direction. However, the cross-sectional profile may instead vary or taper along the length. As indicated in FIGS. 4-5, the fastening member 23, 23a has a circular cross-sectional profile. However, the fastening member 23, 23a may another suitable cross-sectional profile, such as an elliptical or polygonal profile. The fastening member 23, 23a thus has a uniform or variable outer diameter or thickness along its length.

Figure 13:
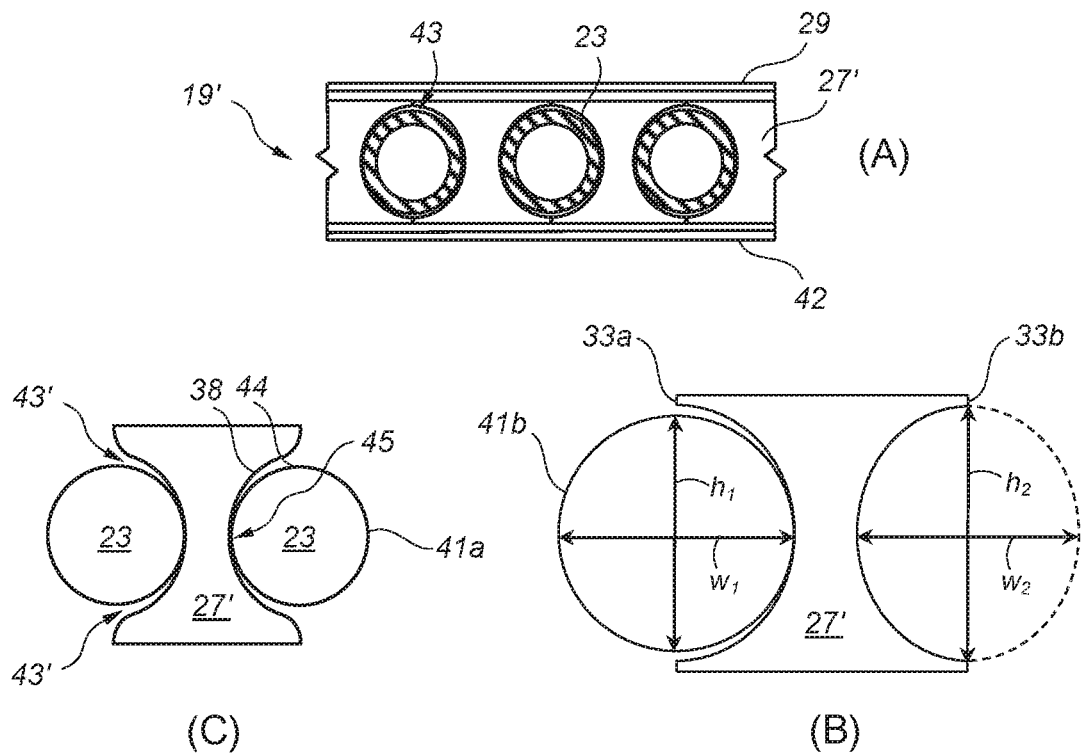
FIGS. 13*a-c* show three views of the root end structure comprising a third embodiment of the first pultruded element.

The fastening member 23, 23a has a local inner side 39, a local outer side 40 and two opposite facing local first sides, as indicated in FIG. 13b-c. Here, only one local first side 41a is show.

The exterior surface of the fastening member 23, 23a is optionally wrapped in a fibre material, as indicated with dashed lines, wherein the wrapped fibre material extends along at least a part of the length of the fastening member 23, 23a.

Figure 11:
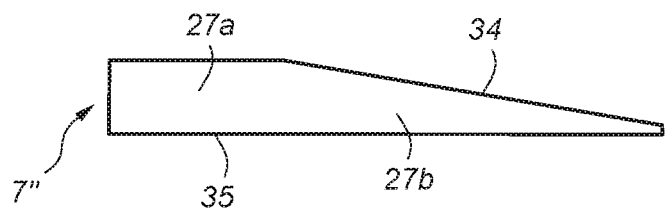
FIG. 11 shows a side view of a first embodiment of the first pultruded element.
Figure 12:
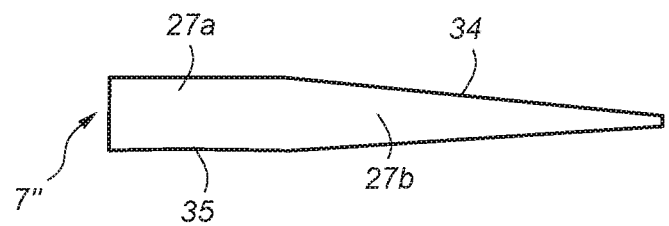
FIG. 12 shows a side view of a second embodiment of the first pultruded element.

FIGS. 11-12 show a side view of a first and a second embodiment of the first pultruded element 27 comprising a first portion 27a and a second portion 27b. The first portion 27a extends from a local root end 7" towards an opposite end while the second portion 27b extends from the first portion 27a to said opposite end.

Figure 18:
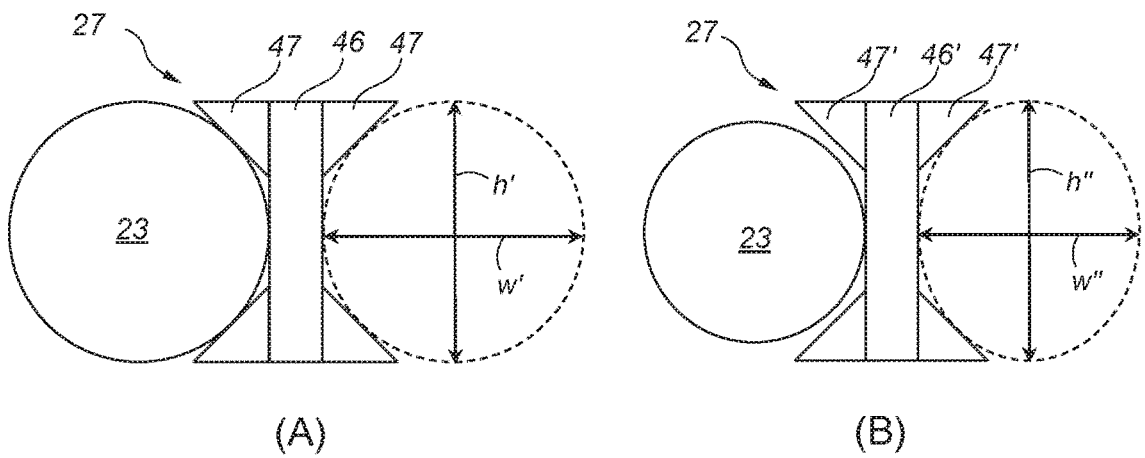
FIG. 18 shows a longitudinal view of the root end structure with a misalignment between the outer layers and the first pultruded element.
Figure 19:
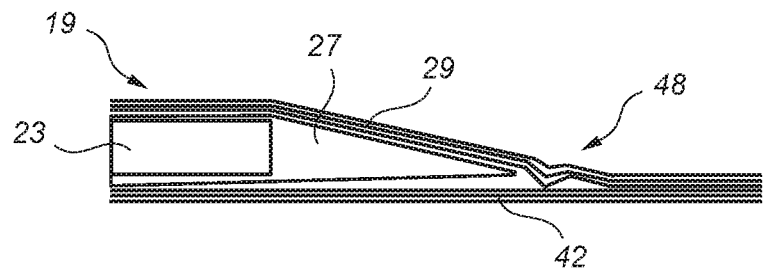
FIG. 19 shows a longitudinal view of the root end structure with the first pultruded element conforming to the shape of the outer layers.

The first portion 27a has a uniform thickness along its local length, as indicated in FIGS. 11-12. The local length of the first portion 27a corresponds substantially to the length of the fastening member 23, 23a, as indicated in FIGS. 18-19.

The second portion 27b has a tapered profile extending beyond the fastening member 23, 23a where the local thickness tapers from a maximum thickness to a minimum thickness. As indicated in FIG. 11, the first and second portions 27a, 27b may form a continuous local outer side 35 where the second portion 27b tapers from the inner side 34 to the local outer side 35. As indicated in FIG. 11, the second portion 27b may form inclined local inner and outer sides 34, 35 where the second portion 27b tapers towards a local central line.

The second pultruded element 28 has a similar configuration as the first pultruded element 27 shown in FIGS. 11-12.

FIGS. 13a-c show three views of the root end structure 19' comprising a third embodiment of the first pultruded element 27'. FIGS. 13b-c show a simplified view of one first pultruded element 27' where the local first sides 41a, 41b of a pair of adjacent bushings 23 extend into the local second sides 33a, 33b of the first pultruded bushing 27'.

The first pultruded element 27' has a thickness greater than the outer diameter of the fastening member 23. The inner layers 29 extend along the local inner sides 34 and the outer layers 42 extend along the local outer sides 35 of the first pultruded elements 27'.

Figure 14:
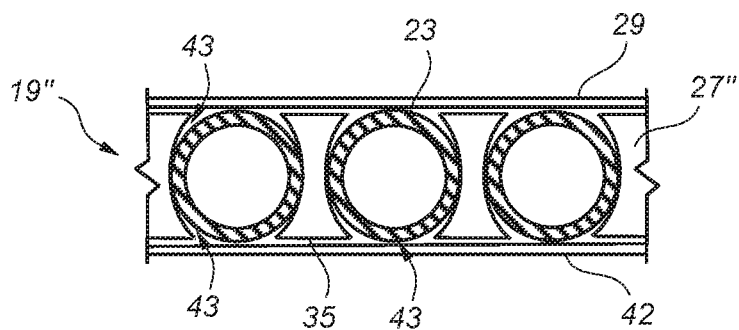
FIG. 14 shows the root end structure comprising a fourth embodiment of the first pultruded element.

The local second sides 33a, 33b of a pair of adjacent first pultruded elements 27' may contact each other, as indicated in FIG. 13a, or be spaced apart, as indicated in FIG. 14.

A number of gaps 43 are formed between a first side surface 44 of the bushing 23 and the second side surface 38 of the first pultruded element 27'. Here, a first gap 43' and a second gap 43' are formed on opposite sides of the bushing 23. The first and second gaps 43' extend in the longitudinal direction and further along a second circumference direction defined by the second side surface 38.

Here, the second side surface 38 has an elliptical arc profile while first side surface 44 has a circular profile. The second side surface 38 and the adjacent local side surfaces may form a sharp transition, as indicated in FIG. 13b, or a smooth transition, as indicated in FIG. 13c.

The elliptical arc profile of the second side surface 38 forms part of an inscribed profile having a predetermined height, $h_2$, and width, $w_2$, as illustrated in FIG. 13b. Further, the circular profile of the first side surface 44 forms part of a circumscribed profile having a predetermined height, $h_1$, and width, $w_1$, as also illustrated in FIG. 13b.

Here, the first pultruded element 27' contacts the adjacent bushings 23 at a contact area formed on the second side surface 38, as indicated in FIGS. 13b-c. The first and second gaps 43' has a radial distance that varies along the second side surface 38, as indicated in FIGS. 13a-c. This allows for an adaptive positioning of the first pultruded element 27' in the longitudinal direction.

FIG. 14 shows the root end structure 19" comprising a fourth embodiment of the first pultruded element 27" where the first pultruded element 27" has a local thickness smaller than the outer diameter of the bushings 23. The inner and outer layers 29, 42 are here contacting both the local inner sides 35 of the first pultruded elements and the local inner sides 43 of the bushings 23.

Figure 15:
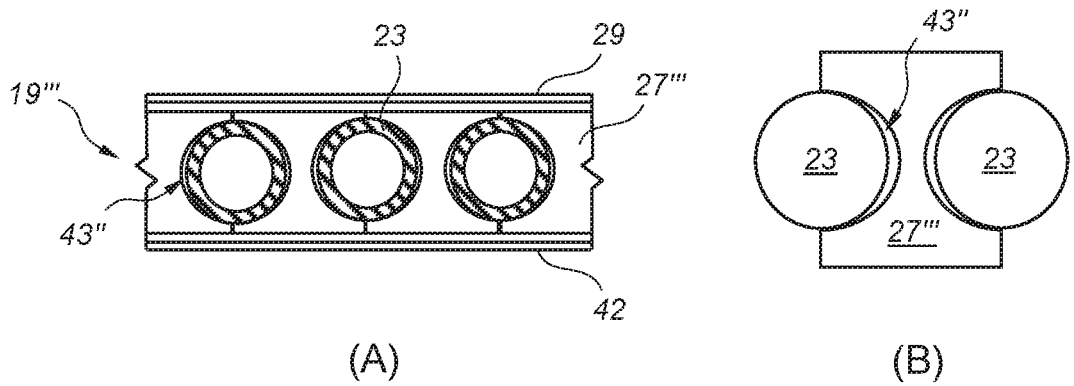
FIGS. 15*a-b* show two views of the root end structure comprising a fifth embodiment of the first pultruded element.

FIGS. 15a-b show two views of the root end structure 19''' comprising a fifth embodiment of the first pultruded element 27'''. FIG. 15b shows a simplified view of one first pultruded element 27''' where a pair of adjacent bushings 23 extends partly in the recesses 36 formed in the first pultruded bushing 27'''.

Here, a central gap 43" is formed between the first and second side surfaces 38, 44 wherein the radial distance varies along the first circumference direction. A first contact area 45' and a second contact area 45" are further formed between the first and second side surfaces 38, 44 where the bushings 23 are contacting the pultruded element 27''' at these first and second contact areas 45". This allows for an adaptive positioning of the first pultruded element 27''' in the width direction.

Here, the second side surface 38 has an alternative elliptical arc profile and the first side surface 44 has a circular profile.

FIGS. 16a-b show a sixth embodiment of the first pultruded element 27'''' where the second side surface of the recesses 36 comprises a planar surface portion 38' arranged between two curved surface portions 38". The curved surface portions 38" may be shaped as a circular arc segments, as indicated in FIG. 16a. The inner arc segment has a first radius, $r_1$, and outer arc segment has a second radius, $r_2$. The first and radiuses $r_1$, $r_2$ have the same or different values.

The curved surface portions 38" may also be shaped as elliptical or super-elliptical arc segments, as indicated in FIG. 16b. The two elliptical arc segments have the same or different major and minor radiuses.

Figure 17:
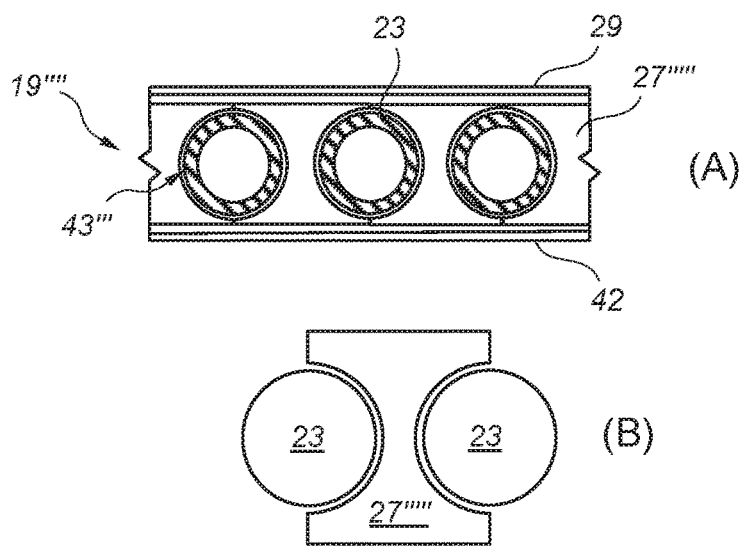
FIGS. 17*a-b* show two views of the root end structure comprising a seventh embodiment of the first pultruded element.

The planar surface portion 38' functions as contact areas for contacting the bushings 23. Unlike the embodiments of FIGS. 15 and 17, the gaps 43 can be formed while maintaining a minimum width between the recesses 36 in the width direction, as indicated by dashed lines in FIG. 16a.

FIGS. 17a-b show three views of the root end structure 19'''' comprising a seventh embodiment of the first pultruded element 27'''' where a continuous gap 43''' is formed between the first and second side surfaces 38, 44.

The gap 43''' has a uniform radial distance along the second side surface 38, as indicated in FIG. 17b. The second side surface 38 may have a circular arc profile with an equal height, $h_w$, and width, $w_w$, and the first side surface 44 may further have a circular profile with an equal height, $h_b$, and width, $w_b$, as indicated in FIG. 17b. The first and second side surfaces 38, 44 may also have an elliptical arc profile, as indicated in FIG. 17c. The first and second side surfaces 38, 44 have a common centre point, but different radiuses. This increases the flexibility of the adaptive positioning of the first pultruded element 27''''.

Here, the bushings 23 are not in a firm and close contact with the first pultruded element 27'''' as the first pultruded element 27'''' is able to move to relative to the bushings in both the thickness direction and in the width direction.

FIGS. 18a-b shows a further alternative embodiment of the first pultruded element 27. Here, the first pultruded element 27 is formed by a number of sub-pieces are arranged relative to each other.

A first sub-piece 46 having a rectangular cross-sectional profile in the width direction is arranged between a pair of adjacent bushings 23. A first set of second sub-pieces 47 is arranged at the local inner side 34 and a second set of second sub-pieces 47 is arranged at the local outer side 35. The individual second sub-pieces 47 of each set are positioned on opposite facing sides of the first sub-piece 46.

In conventional root end design, as indicated in FIG. 18a, all the first and second sub-pieces 46, 47 are contacting the bushing 23 to prevent any relative movements. The first and second sub-pieces 46, 47 together form an inscribed circular profile having equal height and width.

In the present invention, as indicated in FIG. 18b, only the first sub-piece 46 is contacting the bushing 23 and the second sub-pieces 47' are spaced apart from the bushing 23 to form the gaps 43. The first and second sub-pieces 46, 47' together form an inscribed substantial elliptical profile having a height, h", that is greater than its width, w". Here, the bushing 23 forms a circumscribed circular profile having a height, h', and a width, w', of equal values. This also allows for an adaptive positioning of the first pultruded elements 27 in the longitudinal direction, FIG. 19 shows a longitudinal view of the root end structure 19 with a misalignment between the outer layers 42 and the first pultruded element 27 in the longitudinal direction. This misalignment results in wrinkles 48 forming in the transition area between the inner and outer layers 29, 42.

This misalignment may occur when evacuating the root end structure 19 during the vacuum assisted resin infusion process.

Figure 20:
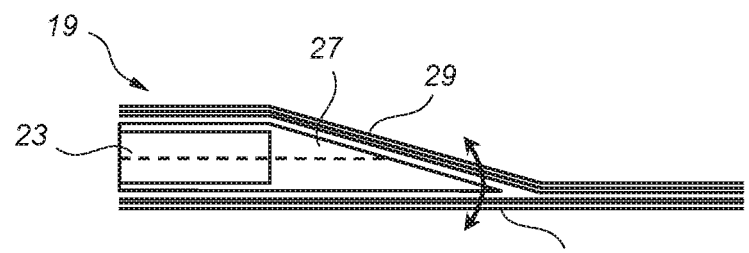
FIG. 20 shows a transverse view of the root end structure with the first pultruded element arranged between a pair of adjacent fastening members.

FIG. 20 shows a longitudinal view of the root end structure 19 with the first pultruded element 27 conforming to the shape of the outer layers 42. This is achieved by providing one or more gaps 43 between the first and second side surfaces 38, 44. The gaps 43 in turn enable the first pultruded element 27 to move relative to the bushings 23 (indicated by arrow) during the vacuum assisted resin infusion. Thereby, allowing the first pultruded elements 27 to passively adapt its longitudinal position relative to the outer layers 42 during the vacuum assisted resin infusion.

Figure 21:
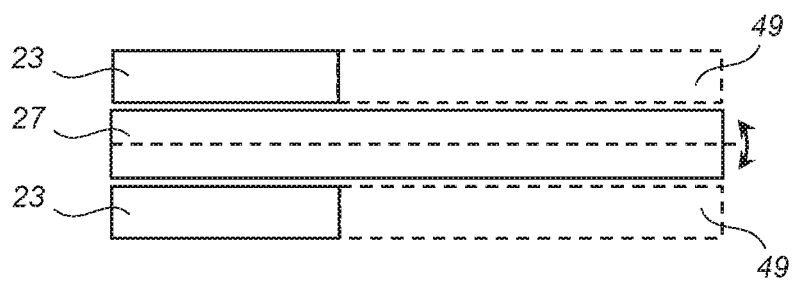

FIG. 21 shows a transverse view of the root end structure 19 with the first pultruded element 27 arranged between a pair of adjacent bushings 23.

Here, the first pultruded element 27 is prevented from moving within the width plane (indicated by arrow) relative to the bushings 23 and spacer elements 49 while being able to move relative to the bushings 23 in the thickness plane, as indicated in FIG. 20.

The spacer elements 49 are positioned relative to the bushings 23 and extend further in the longitudinal direction. The spacer element 49 has a length substantially corresponding to the local length of the second portion 27b of the first pultruded element 27. The spacer element 49 has a tapered profile in the longitudinal direction corresponding to the tapered profile of the second portion 27b. The abovementioned gaps 43, optionally, extend along the length of the bushings 23 and further along at least a part of the length of the spacer element 49.

The abovementioned embodiments may be combined in any combinations without deviating from the present invention.

The invention claimed is:

1. A root end structure (19) of a wind turbine blade (5), the root end structure (19) extending from a blade root (7) into a root end portion (14) of a blade shell (11) formed by at least one blade part having an inner surface (21), an outer surface (22) and at least one blade joint edge, the root end structure (19) comprising:
   a plurality of fastening members (23) distributed along the root end (7) of said at least one blade part in a circumference direction, wherein each of the fastening members (23) has a first inner surface (39), a first outer surface (40) and opposite facing first side surfaces (41a, 41b) each extending in a longitudinal direction,
   wherein a second pultruded element (28') is arranged between an outermost fastening member (23a) and a blade joint edge (20a, 20b) of the at least one blade part, wherein the second pultruded element (28') has a second inner surface (34), a second outer surface (35) and opposite facing second side surfaces (33a, 33b) further extending in the longitudinal direction,
   wherein the root end structure (19) further comprises a number of outer layers (44) of a fibre material extending along the outer surface (22) and a number of inner layers (29) of a fibre material extending along the inner surface (21), and
   wherein the second pultruded element (28') comprises a transition portion (31, 31') extending from one second side surface (33b) towards the other one of the second side surfaces (33a), and wherein a local thickness of said transition portion (31, 31') tapers towards the blade joint edge (20a, 20b) and/or said one second side surface (33a) in the circumference direction.

2. The root end structure according to claim 1, characterised in that said transition portion (31, 31') forms a transitional contact surface (32) contacting the inner layers (29), wherein said transitional contact surface (32) forms at least a part of the second inner surface (34).

3. The root end structure according to claim 2, characterised in that said transitional contact surface (32) further forms at least a part of said one second side surface (33b).

4. The root end structure according to claim 1, characterised in that the second pultruded element (28") is terminated at an inner point (37) in a thickness direction, wherein the outermost fastening member (23a) extends beyond the inner point (37) of the second pultruded element (28") in the thickness direction.

5. The root end structure according to claim 1, characterised in that the transition portion (31) has a planar surface profile arranged in an angle relative to the second outer surface (35) of the second pultruded element (28").

6. The root end structure according to claim 1, characterised in that the transition portion (31) has a curved surface profile.

7. The root end structure according to claim 6, wherein the curved surface profile comprises a circular or elliptical arc profile having a predetermined radius.

8. The root end structure according to claim 1, wherein the local thickness of said transition portion (31, 31') tapers from the other one of the second side surfaces (33) towards the blade joint edge (20a, 20b) and/or from the one of the second side surfaces (33b) towards the other one of the second side surface (33a) in the circumference direction.

9. The root end structure according to claim 1, characterised in that the transition portion (31) extends along partly or fully along a length of the second pultruded element (28').

10. The root end structure according to claim 1, characterised in that the second pultruded element (28''') comprises a first sub-piece (28a) and at least one second sub-piece (28b) arranged relative to the first sub-piece (28a), wherein said first sub-piece (28a) and said at least one second sub-piece (28b) extend in the longitudinal direction.

11. The root end structure according to claim 1, further comprising a first pultruded element (27) arranged between at least one pair of fastening members (23), wherein the first pultruded element (27) has a second inner surface, a second outer surface and opposite facing second side surfaces further extending in the longitudinal direction.

12. A wind turbine blade, the wind turbine blade (5) extending from a blade root (7) to a tip end (8) in a longitudinal direction and further from a leading edge (9) to a trailing edge (10) in a chordwise direction, the wind turbine blade (5) comprising a blade shell (11) formed by at least two blade parts each having an inner surface (21) and an outer surface (22), wherein said at least two blade parts are connected along at least one blade joint interface in the longitudinal direction, each blade joint interface is defined by a first joint edge (20a) of one blade part and a second joint edge (20b) of another blade part, characterised in that said at least two blade parts comprises a root end structure (19) configured according to claim 1.

13. A method of manufacturing a wind turbine blade, comprising the steps of:
laying up a number of outer layers (44) of a fibre material along a blade mould surface (26);
providing a plurality of fastening members (23) configured to mount the wind turbine blade (5) to a rotor hub interface or a pitch bearing unit;
positioning said fastening members (23) relative to said outer layers (44) at a root end (7) of said wind turbine blade (5);
positioning a second pultruded element (28') between an outermost fastening member (23a) and a blade joint edge (20a, 20b) of the at least one blade part;
further laying up a number of inner layers (29) of a fibre material along said second pultruded element (28') and said fastening members (23) to form a root end structure (19);
enclosing at least the root end structure (19) via a vacuum bag material;
introducing resin into said fibre material; and
curing said resin to form a cured blade part,
wherein the inner layers (29) extends over a transitional contact surface (32) of the second pultruded element (28') and further along a mould edge surface (25) during the lay-up,
wherein the second pultruded element (28') has a second inner surface (34), a second outer surface (35) and opposite facing second side surfaces (33a, 33b) further extending in the longitudinal direction, and
wherein the second pultruded element (28') comprises a transition portion (31, 31') extending from one second side surface (33b) towards the other one of the second side surfaces (33a), and wherein a local thickness of said transition portion (31, 31') tapers towards the blade joint edge (20a, 20b) and/or said one second side surface (33a) in the circumference direction.

14. The method according to claim 13, characterised in that the inner layers (29) further extends over a portion of the outermost fastening member (23a).

15. The method according to claim 13, characterised in that excess fibre material of at least the inner layers (29) are trimmed off in a post lay-up step or in a post-moulding step.

16. The method according to claim 13, further comprising the step of positioning a first pultruded element (27) between at least one pair of fastening members (23), and wherein the step of further laying up the number of inner layers (29) of the fibre material along said second pultruded element (28') further comprises laying up the number of inner layers (29) of the fibre material along said first pultruded element (27) and said fastening members (23) to form the root end structure (19).

17. A root end structure (19) of a wind turbine blade (5), the root end structure (19) extending from a blade root (7) into a root end portion (14) of a blade shell (11) formed by at least one blade part having an inner surface (21), an outer surface (22) and at least one blade joint edge, the root end structure (19) comprising:
a plurality of fastening members (23) distributed along the root end (7) of said at least one blade part in a circumference direction, wherein each of the fastening members (23) has a first inner surface (39), a first outer surface (40) and opposite facing first side surfaces (41a, 41b) each extending in a longitudinal direction,
wherein a second pultruded element (28') is arranged between an outermost fastening member (23a) and a blade joint edge (20a, 20b) of the at least one blade part, wherein the second pultruded element (28') has a second inner surface (34), a second outer surface (35) and opposite facing second side surfaces (33a, 33b) further extending in the longitudinal direction,
wherein the root end structure (19) further comprises a number of outer layers (44) of a fibre material extending along the outer surface (22) and a number of inner layers (29) of a fibre material extending along the inner surface (21),
wherein the second pultruded element (28') comprises a transition portion (31, 31') extending from one second side surface (33b) towards the other one of the second side surfaces (33a), and wherein a local thickness of said transition portion (31, 31') tapers towards the blade joint edge (20a, 20b) and/or said one second side surface (33a), and
wherein the second pultruded element (28') is terminated at an inner point (37) in a thickness direction, wherein the outermost fastening member (23a) extends beyond the inner point (37) of the second pultruded element (28') in the thickness direction.

18. A wind turbine blade, the wind turbine blade (5) extending from a blade root (7) to a tip end (8) in a longitudinal direction and further from a leading edge (9) to a trailing edge (10) in a chordwise direction, the wind turbine blade (5) comprising a blade shell (11) formed by at least two blade parts each having an inner surface (21) and an outer surface (22), wherein said at least two blade parts are connected along at least one blade joint interface in the longitudinal direction, each blade joint interface is defined by a first joint edge (20a) of one blade part and a second joint edge (20b) of another blade part, wherein said at least two blade parts comprises a root end structure (19) configured according to claim 16.

19. A root end structure (19) of a wind turbine blade (5), the root end structure (19) extending from a blade root (7) into a root end portion (14) of a blade shell (11) formed by at least one blade part having an inner surface (21), an outer surface (22) and at least one blade joint edge, the root end structure (19) comprising:
  a plurality of fastening members (23) distributed along the root end (7) of said at least one blade part in a circumference direction, wherein each of the fastening members (23) has a first inner surface (39), a first outer surface (40) and opposite facing first side surfaces (41a, 41b) each extending in a longitudinal direction,
  wherein a second pultruded element (28') is arranged between an outermost fastening member (23a) and a blade joint edge (20a, 20b) of the at least one blade part, wherein the second pultruded element (28') has a second inner surface (34), a second outer surface (35) and opposite facing second side surfaces (33a, 33b) further extending in the longitudinal direction,
  wherein the root end structure (19) further comprises a number of outer layers (44) of a fibre material extending along the outer surface (22) and a number of inner layers (29) of a fibre material extending along the inner surface (21),
  wherein the second pultruded element (28') comprises a transition portion (31, 31') extending from one second side surface (33b) towards the other one of the second side surfaces (33a), and wherein a local thickness of said transition portion (31, 31') tapers towards the blade joint edge (20a, 20b) and/or said one second side surface (33a), and
  wherein the transition portion (31) has a planar surface profile arranged in an angle relative to the second outer surface (35) of the second pultruded element (28').

20. A wind turbine blade, the wind turbine blade (5) extending from a blade root (7) to a tip end (8) in a longitudinal direction and further from a leading edge (9) to a trailing edge (10) in a chordwise direction, the wind turbine blade (5) comprising a blade shell (11) formed by at least two blade parts each having an inner surface (21) and an outer surface (22), wherein said at least two blade parts are connected along at least one blade joint interface in the longitudinal direction, each blade joint interface is defined by a first joint edge (20a) of one blade part and a second joint edge (20b) of another blade part, wherein said at least two blade parts comprises a root end structure (19) configured according to claim 19.

* * * * *